No. 640,398. Patented Jan. 2, 1900.
E. MERTZ.
STEAM ENGINE.
(Application filed Sept. 20, 1898.)
(No Model.) 6 Sheets—Sheet 3.

No. 640,398. Patented Jan. 2, 1900.
E. MERTZ.
STEAM ENGINE.
(Application filed Sept. 20, 1898.)
(No Model.) 6 Sheets—Sheet 4.

WITNESSES:
Fred White
Thomas F. Wallace

INVENTOR:
Emile Mertz,
By his Attorneys:

No. 640,398. Patented Jan. 2, 1900.
E. MERTZ.
STEAM ENGINE.
(Application filed Sept. 20, 1898.)
(No Model.) 6 Sheets—Sheet 5.

No. 640,398. Patented Jan. 2, 1900.
E. MERTZ.
STEAM ENGINE.
(Application filed Sept. 20, 1898.)
(No Model.) 6 Sheets—Sheet 6.

WITNESSES:
Fred White
Thomas F. Wallace

INVENTOR:
Emile Mertz,
By his Attorneys
Arthur E. Fraser

UNITED STATES PATENT OFFICE.

EMILE MERTZ, OF BASLE, SWITZERLAND.

STEAM-ENGINE.

SPECIFICATION forming part of Letters Patent No. 640,398, dated January 2, 1900.

Application filed September 20, 1898. Serial No. 691,408. (No model.)

*To all whom it may concern:*

Be it known that I, EMILE MERTZ, a citizen of the French Republic, residing at Basle, Switzerland, have invented new and useful Improvements in Steam-Engines, of which the following is a clear and complete specification.

This invention has for its object a vertical or horizontal equilibrated steam-engine with one or more quadruple-acting cylinders, each having two pistons fitted to two different rods, one of which passes through the other and actuates, through the medium of a connecting-rod, a crank arranged at an angle of one hundred and eighty degrees with the cranks actuated by the second piston-rod through the medium of two connecting-rods placed on each side of the first-mentioned connecting-rod in such a manner that steam being admitted alternately between the two pistons and in contact with the outer faces thereof the said pistons always move in opposite directions, so that the pressures which the connecting-rods actuated by the said pistons tend to exert upon the bearings of the driving-shaft are always counterbalanced, whereby the machine runs smoothly and without jars or shocks.

In the accompanying drawings, Figures 1, 2, 3, 4, 5, 6, and 7 show, as an example of my invention, a steam-engine with two cylinders in which the steam works successively.

On the frame A of the engine, which frame forms a closed space, are fixed the two cylinders B B', each having a pair of pistons C D C' D'. The rod E or E' of each piston C or C' is connected by a connecting-rod F or F' to a crank $a$ or $a'$ of the driving-shaft H, which is arranged in the lower part of the frame A and is supported near its ends by suitable supports $b$ $b$, secured to the frame A, and at intermediate points by supports $b'$ $b'$, also connected to the frame A. The rod G or G' of each piston D or D', which rod is hollow and through which passes the rod E or E' of the corresponding piston C or C', is connected by two rods K K or K' K' to two cranks $c$ $c$ or $c'$ $c'$ on the driving-shaft H, which cranks are placed at an angle of one hundred and eighty degrees to the corresponding crank $a$ or $a'$.

It is obvious that the piston C or C' of each cylinder B or B' will move in an opposite direction to that in which the other piston D or D' of the same cylinder moves. Furthermore, the crank $a$ is at an angle of ninety degrees to the crank $a'$, and the cranks $c$ $c$ are at an angle of ninety degrees to the cranks $c'$ $c'$.

I is a box or case fitted to the shaft H and designed to contain the centrifugal governor which operates, as hereinafter described, the mechanism of the distributing device inclosed in the valve-chest J, designed for the distribution of steam to the cylinder B. This chest J communicates with the middle and with the ends of the cylinder B, respectively, by the passages $f$, $g$, and $e$, and is provided with a hollow cylindrical valve R, having three annular peripheral grooves $h$ $k$ $o$, of which $h$ is designed to place the passages $g$ and $e$ in communication with an exhaust-passage $i$, which opens into an intermediate chamber L, placed between the two cylinders B and B', while the passage $k$ is in communication by orifices $j$ $j$ with the interior $l$ of the hollow valve and is designed to be alternately placed in communication with the passages $e$ and $f$. The third annular groove $o$ is adapted to make communication between the passage $f$ and the exhaust-passage $n$, opening into the intermediate chamber L, when the valve R is near its lowermost position. The lower space $d$ of the valve-chest J (which space communicates with the inlet for the fresh steam, regulated by the valve $A^2$) is placed in communication with the passage $g$ when the valve R is near its uppermost position.

The valve R' and its chest J', which effect the distribution of the steam in the cylinder B', are of analogous construction to the valve R and chest J. The letters $d'$, $g'$, $i'$, $h'$, $e'$, $k'$, $j'$, $f'$, $n'$, $o'$, and $l'$ indicate corresponding parts to those above referred to by the letters $d$, $g$, $i$, $h$, $e$, $k$, $j$, $f$, $n$, $o$, and $l$. The space $d'$ is, however, in communication with the intermediate chamber L, while the passages $n'$ and $i'$ communicate with the exhaust M for the steam which has worked successively in the two cylinders B and B', whether such exhaust takes place into a condenser or into the atmosphere.

The rods N N' of the valves R R' are screwed into guide-pieces $R^2$, running in guides $R^3$ and connected by rods O O' and bell-crank levers S S' to rods T T' of eccentrics U U'. The eccentric U' is keyed upon the driving-shaft H, while the other, U, is fitted to the side of the box I of the centrifugal governor, so as be controlled by this latter in such a manner that its eccentricity with respect to the driving-shaft H can be varied by the said governor to vary the admission of steam to the cylinder B. By more or less unscrewing the rods N N' from the guide-pieces $R^2$ the position of the valves R R' can be speedily adjusted.

The lower part of the frame A, which is provided with two removable doors or covers $R^4$, can be filled with oil, so as to effect the lubrication of all the movable parts of the engine which are inclosed in the said frame.

The operation of the engine above described is as follows: Suppose the movable parts of the engine in the position shown in Figs. 1, 3, 6, and 7 of the drawings—that is to say, in the position wherein the pistons C and D are just reaching the middle of the cylinder B and the pistons C' D' are near the middle of their stroke. If the valve R moves downward in such a manner as to bring the groove $k$ opposite to the passage $e$, fresh steam will pass from outside the valve R through the orifices $j\ j$ into the passage $e$ and the cylinder R, so as to exert pressure upon the inner faces of the two pistons C and D and separate them from one another, while the partially-expanded steam in the said cylinder B above the piston C and below the piston D will escape through the passages $f\ o\ n$ and $g\ h\ i$, respectively, into the intermediate chamber L, whence it passes to the cylinder B'. At the same moment the steam which has already done work in the cylinder B will pass from the chamber L partly through the passage $d$ and below the bottom edge of the valve R' into the passage $g'$, so as to operate upon the lower face of the piston D' and partly through the passages $l'\ j'\ k'$ into the passage $f'$, so as to act upon the upper face of the piston C' in such a manner as to drive the two pistons C' and D' toward one another, thereby expelling the expanded steam which has previously done work in the cylinder B' through the passages $e'$, $h'$, and $i'$ to the exhaust M, Fig. 4. When the two pistons C' D' have reached the middle of the cylinder B'—that is to say, after the first quarter of a revolution of the driving-shaft H—the pistons C D continue to separate from one another and the pistons C' D' commence to separate from one another, the partially-expanded steam from the intermediate chamber L passing from the interior $l'$ of the valve R' through the orifices $j'\ j'$ into the passage $e'$ and acting upon the inner faces of the two pistons C' D', causing them to separate, while the expanded steam in the said cylinder B' above the piston C' and below the piston D' will pass, respectively, through the passages $f'\ o'\ n'$ and $g'\ h'\ i'$ to the exhaust M. At the end of the second quarter of a revolution—that is to say, when the two pistons C D have reached the ends of the cylinder B—the pistons C' D' continue to separate from one another, while the pistons C D approach one another, steam then passing, on the one hand, through $d$ below the lower edge of the valve R into the passage $g$ and operating upon the lower face of the piston D, and, on the other hand, from the valve-interior $l$ through $j$ and $k$ into the passage $f$, so as to operate upon the upper face of the piston C in such a manner as to drive the pistons C and D toward one another, while the partially-expanded steam which is contained between the two pistons C D will escape through the passages $e$, $h$, and $i$ into the intermediate chamber L, whence it escapes to do work in the cylinder B'. After the third quarter of a revolution—that is to say, when the pistons C' and D' have reached the ends of the cylinder B'—the pistons C D continue to approach one another, while the pistons C' D' are also approaching one another, partially expanded steam which has previously done work in the cylinder B passing from the intermediate chamber L, on the one hand, through $d'$ and $g'$, under the lower face of the piston D', and, on the other hand, through $l'$, $j'$, $k'$, and $f'$ to the upper face of the piston C' in such a manner as to drive the two pistons C' D' toward one another, while the expanded steam contained between the two pistons C' D' will escape through $e'$, $h'$, and $i'$ to the exhaust M. At the end of the fourth quarter of a revolution—that is to say, when the pistons C and D are reaching the middle of the cylinder B—the movable parts of the engine will have reassumed the positions indicated in Figs. 1, 3, 6, and 7, and the above-described operation will be repeated.

It is obvious from the foregoing description that the two pistons C D or C' D' of each of the cylinders B B' are always moving in opposite directions, as they are constantly subjected to equal steam-pressures acting in opposite directions, so that the pressures which each of the said pairs of pistons C D C' D' tends to exert upon the bearings of the supports of the driving-shaft reciprocally counterbalance one another, and the engine runs smoothly and without jarring or shocks.

Figure 3:
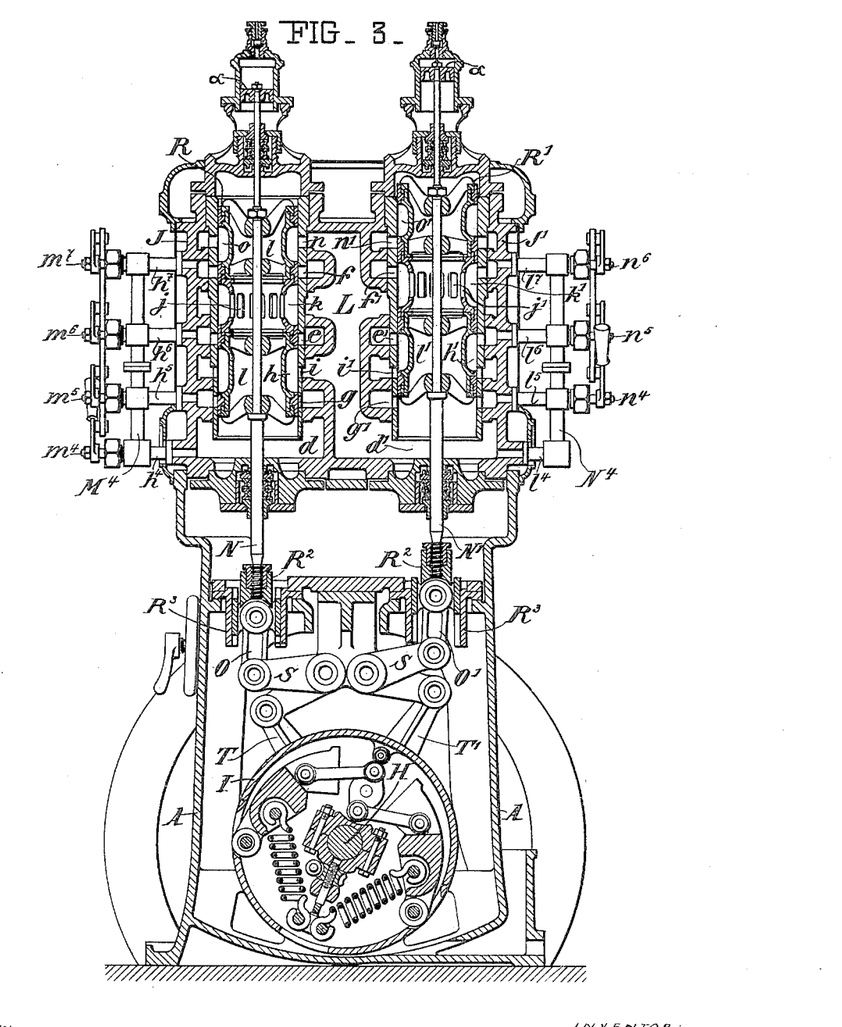
Fig. 3 is a vertical section on the line X X, Fig. 1.
Figure 4:
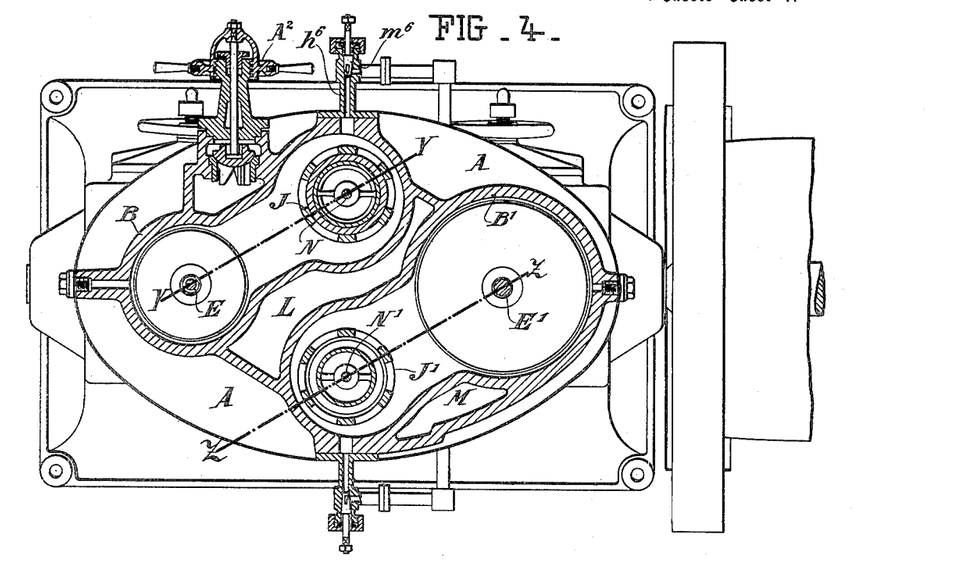
Fig. 4 is a horizontal section on the line V V, Fig. 1.
Figure 5:
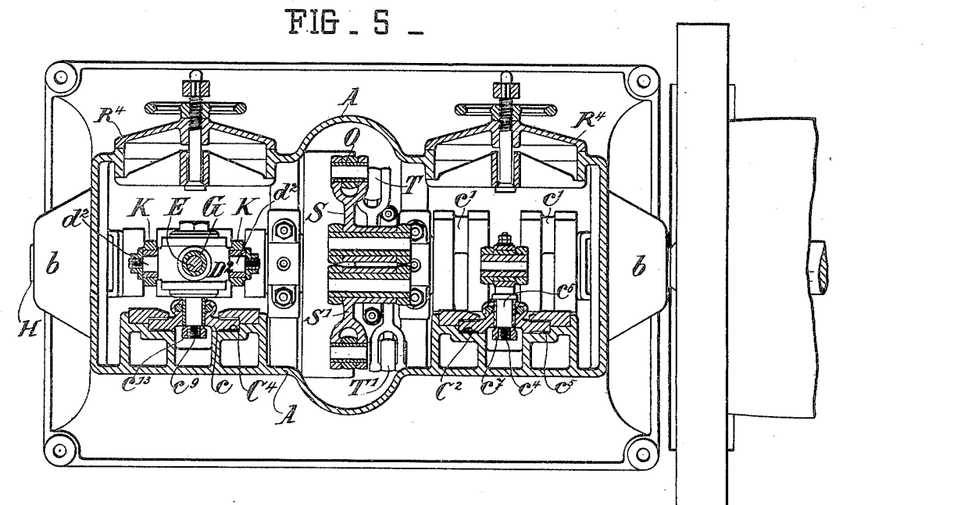
Fig. 5 is a horizontal section on the line W W of the same figure.
Figure 6:
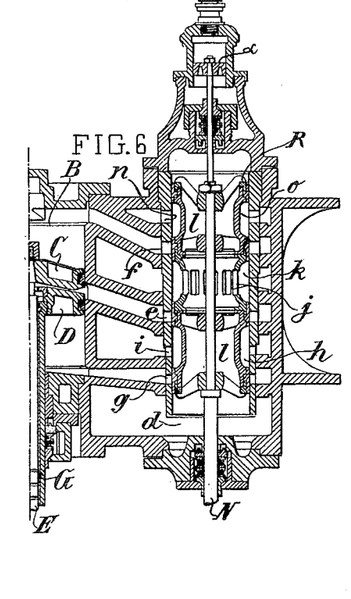
Figs. 6 and 7 are partial sections on the lines Y Y and Z Z, Fig. 4.
Figure 7:
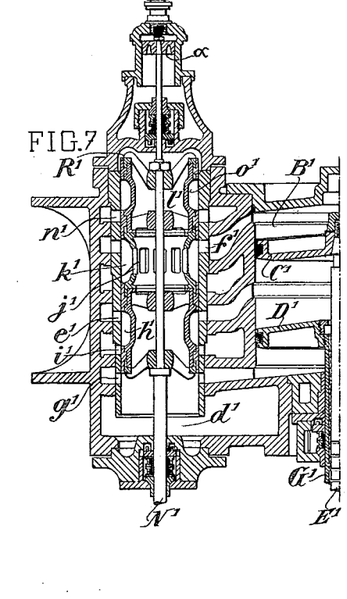

As will be seen from Figs. 3, 6, and 7, the valves R R' are open at their ends, so that they are completely equilibrated. The rods of the valves are, furthermore, connected to pistons $a$, moving in air-chests designed to deaden the jarring of the said valves when moving upward.

Figure 1:
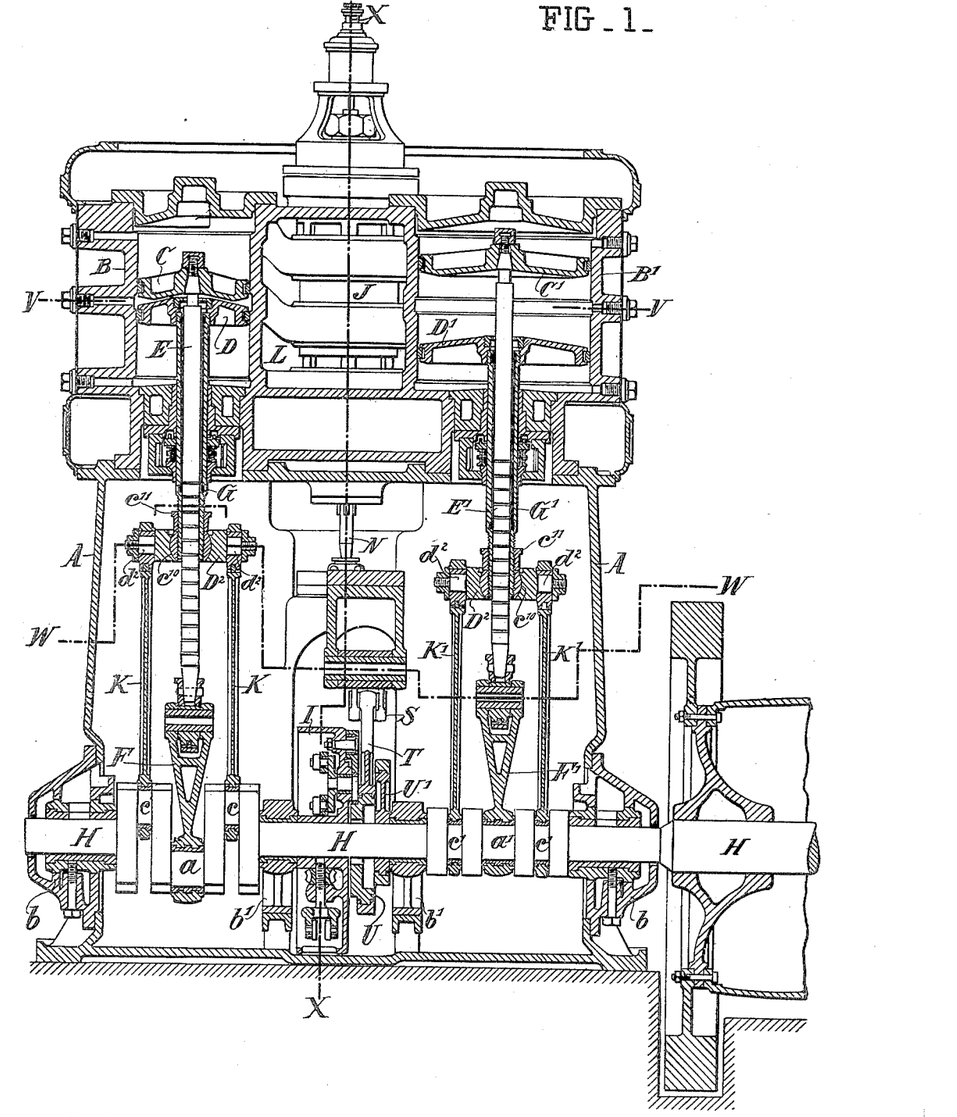
Fig. 1 is a vertical section of the engine in a plane passing through the longitudinal axis of each cylinder.
Figure 2:
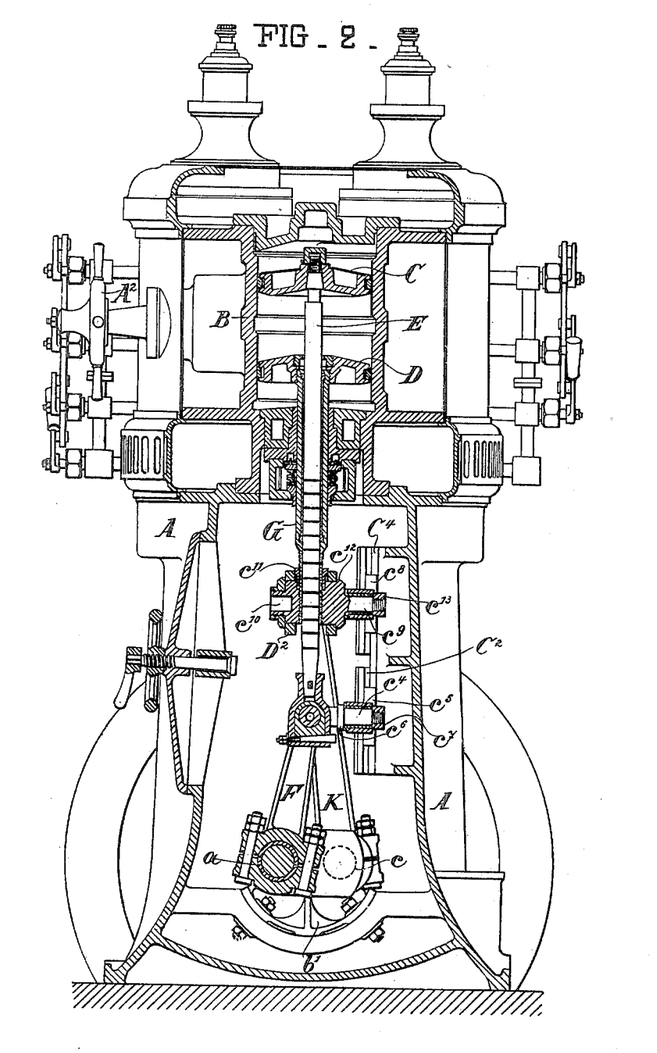
Fig. 2 is a side elevation of the engine, partly in section, the pistons of the high-pressure cylinder being supposed to be in the middle of their strokes.

The rods E E' of the upper pistons C C' are guided, Fig. 2, by means of guide-pieces $c^5$, fitted to pivots $c^4$, connected to the said rods E E', in slides C$^2$, fixed to the frame of the engine, each of the said pivots $c^4$ being held in the corresponding guide-piece $c^5$ by a collar $c^6$ and a nut $c^7$, screwed upon the screw-threaded end of the said pivot.

Figure 9:
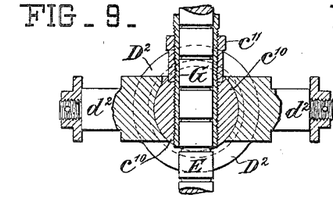
Figure 10:
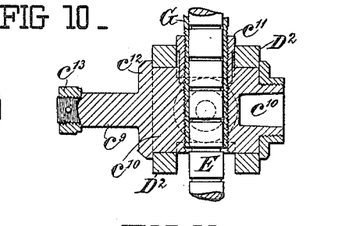
Figures 11, 12, 13, 14, 15, 16, 17:
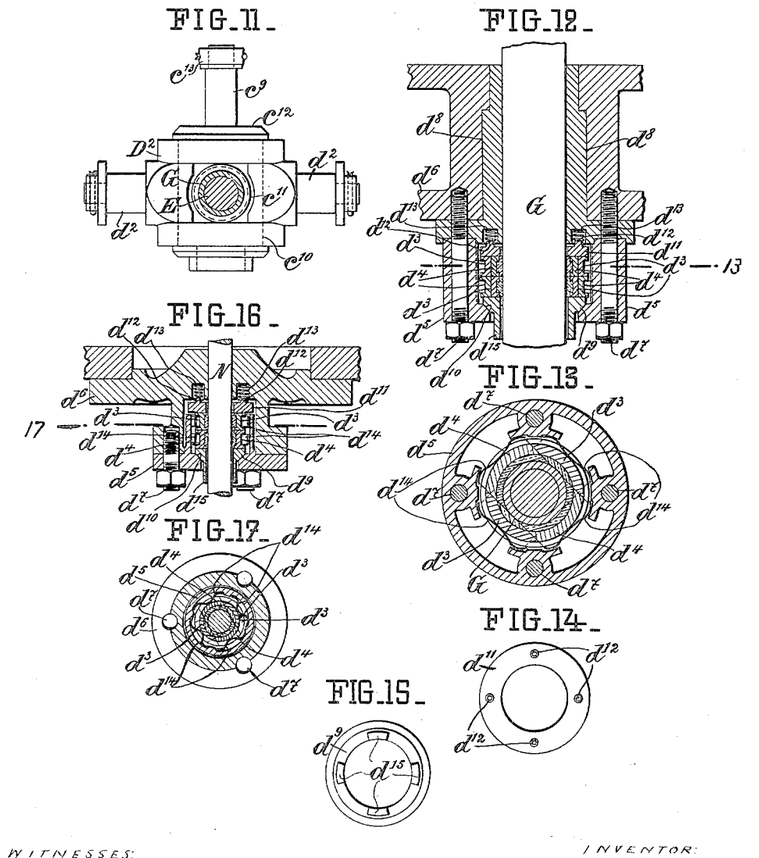

The hollow rods G G' of the lower pistons D D' are guided by means of guide-pieces $c^8$, fitted to pivots $c^9$, connected to the said rods G G', in slides C$^4$, fixed to the frame of the engine, each of the said pivots $c^9$ being made in one with a piece $c^{10}$, Figs. 9, 10, and 11, in which is screwed the piston-rod G or G', which is held therein by a nut $c^{11}$ and being held in its guide-piece $c^8$ by a collar $c^{12}$ and a nut $c^{13}$, screwed upon the screw-threaded end of the said pivot. Each piece $c^{10}$ is provided with a cylindrical portion, upon which the cross-piece D$^2$ can oscillate, the said cross-piece being provided with two pivots $d^2\,d^2$, which receive the ends of the corresponding connecting-rods K K or K' K' in such a manner that if the length of one rod of either pair K K or K' K' should be a little different from the length of the other rod of the same pair the cross-piece D$^2$ could assume a position slightly inclined with respect to the longitudinal axis of the corresponding piston-rod.

The joints between the inner piston-rods E E' and the lower pistons D D', as also the joints around the piston-rods G G' where these latter pass through the bottoms of the cylinders B B', are made of antifriction metal in the manner, for example, shown in Figs. 12, 13, 14, and 15 for the piston-rod G. Such a joint, Figs. 12, 13, 14, and 15, comprises two superposed rows each formed of four packing-pieces, of which the two opposite pieces $d^3\,d^3$ have the form of segments of a circle and the two others, $d^4\,d^4$, of portions of rings fitting the said segments in such a manner that each row of pieces $d^3\,d^3\,d^4\,d^4$ constitutes an annular packing surrounding the piston-rod G. The pieces $d^4\,d^4$ of one row $d^3\,d^3\,d^4\,d^4$ are directly above the pieces $d^3\,d^3$ of the second row $d^3\,d^3\,d^4\,d^4$, while the pieces $d^4\,d^4$ of this latter row $d^3\,d^3\,d^4\,d^4$ are directly below the parts $d^3\,d^3$ of the first row $d^3\,d^3\,d^4\,d^4$. These two superposed rows of packing-pieces $d^3\,d^3\,d^4\,d^4$ are arranged inside a box $d^5$, fixed to the bottom $d^6$ of the cylinder by bolts $d^7$, which also secure to the bottom a bush $d^8$, arranged in the said bottom $d^6$ and inclosing the rod G. The lower row of the said packing-pieces rests upon a ring $d^9$, supported by an internal annular projection $d^{10}$ in the box $d^5$, and upon the upper row of the said packing-pieces there is applied a washer $d^{11}$, provided with projections $d^{12}$, entering recesses or holes in the bush $d^8$, which recesses or holes contain spiral springs $d^{13}$, acting upon the said washer $d^{11}$, so as to press the two rows of packing-pieces $d^3\,d^3\,d^4\,d^4$ one against the other and to force the lower row of the said packing-pieces against the ring $d^9$ and the latter against the projection $d^{10}$ of the box $d^5$.

The packing-pieces $d^3\,d^3\,d^4\,d^4$, which can be of hard brass lined on the inside with antifriction metal or which may be formed wholly of antifriction metal, are pressed against the rod G by four springs $d^{13}$, the ends of which are applied against internal projections on the box $d^5$ in such a manner that each of the said packing-pieces is subjected to the action of a separate spring. The ring $d^9$ is provided with four lower projections $d^{15}$, passing through the box $d^5$ through an annular hole formed around the rod G in such a manner that by turning the ring $d^9$ by means of a key engaging with the projections it can be ground upon its seat $d^{10}$.

The joints around the rods N N' of the valves R R' where they pass through the said valves are arranged in the same manner as is, for example, shown in Figs. 16 and 17 for the rod N. In these figures the letters $d^3$, $d^3$, $d^4$, $d^4$, $d^5$, $d^6$, $d^7$, $d^9$, $d^{10}$, $d^{11}$, $d^{12}$, $d^{13}$, $d^{14}$, and $d^{15}$ represent parts corresponding to those indicated by the same letters in Figs. 12, 13, 14, and 15.

To enable the cylinders B and B' to be heated before the engine is started, each of the chests J J' of the distributing-valves is connected by four tubes $h^4\,h^5\,h^6\,h^7$ or $l^4\,l^5\,l^6\,l^7$, communicating, respectively, with the passages $d\,g\,e\,f$ or $d'\,g'\,e'\,f'$, to a vertical passage M$^4$ or N$^4$, with which these tubes can be placed in communication by three-way cocks $m^4\,m^5\,m^6\,m^7$ or $n^4\,n^5\,n^6$. With this arrangement if before the engine is started the pistons of the high-pressure cylinder B are brought to a dead-point, steam conveyed through A$^2$ into the space $d$, and the cocks $m^4\,m^5\,m^6\,m^7$ opened, the said steam passes from $d$ through $h^4$, M$^4$, $h^5$, $h^6$, $h^7$, $g$, $e$, and $f$ into the cylinder B and through the passages $n\,i$ into the intermediate chamber L, whence it passes after the cocks $n^4\,n^5\,n^6$ are opened from $d'$ through $l^4\,$N$^4\,l^5\,l^6\,l^7\,g'\,e'\,f'$ into the cylinder B' and through the passages $n'\,i'$ to the exhaust M, so as to heat the cylinders B B'. By afterward opening the exhaust M and a passage extending from the intermediate chamber to the said exhaust the water which has condensed in the engine can be caused to flow away after the driving-shaft H has been slightly rotated to move the pistons C D from their dead-points and start the engine. Shortly afterward the communication between the intermediate chamber L and the exhaust M is closed.

Instead of having cranks $a'$ and $c'\,c'$, to which the connecting-rods F' and K' K' are connected, placed, respectively, at an angle of ninety degrees to the cranks $a$ and $c\,c$, to which the corresponding connecting-rods F and K K, actuated by the pistons of the cylinder B, are connected, the connecting-rods F' and K' K' can be secured to cranks placed at an angle of one hundred and eighty degrees to the corresponding cranks $a$ and $cc$, which the connecting-rods F and K K actuate. Furthermore, if instead of making the engine work with double expansion it is desired to arrange it to work with triple expansion, this is effected by employing in conjunction with the cylinders B B' a third cylinder having two pistons, &c.

Figure 8:
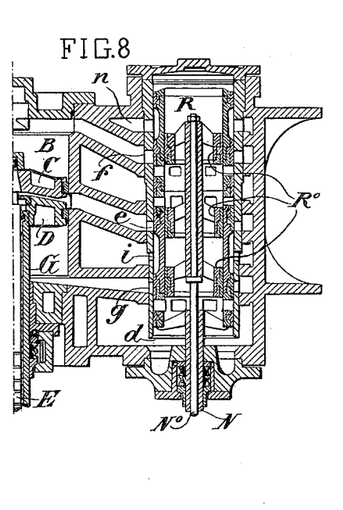
Fig. 8 shows a modification of the distributing-valve, and Figs. 9 to 17 refer to details of construction.

Instead of obtaining in the high-pressure cylinder B variation in the expansion—that is to say, variation in the admission—through the medium of the centrifugal governor acting directly upon the distributing-valve of the said cylinder, the said governor can be caused to actuate this valve R by an eccentric which will give constant admission and vary the expansion by two eccentric valves R$o$, placed inside the valve R upon a rod N$o$, extending through the rod N of the valve R, as illustrated in Fig. 8, the rod N$o$ of the second valve being then alone operated by the governor.

It is obvious that the motor above described can be employed as a stationary engine or that the invention can be applied to locomotives, motor-cars, steamboats, &c. For this latter case the motor is specially advantageous, as it occupies less height than ordinary engines and also because it enables a greater speed than ordinarily to be obtained by virtue of the perfect equilibrium of the pressures of the pistons upon the bearings of the driving-shaft.

Having now particularly described and ascertained the nature of my said invention and in what manner the same is to be performed, I declare that what I claim is—

1. An equilibrated steam-engine having one or more double-acting cylinders, each having two pistons fitted to two different rods of which one passes through the other and is connected by means of a connecting-rod to a crank placed at an angle of one hundred and eighty degrees to the cranks to which the second piston-rod is connected through the medium of two connecting-rods placed on each side of the first-named connecting-rod, each of the said cylinders being combined with an equilibrated distributing device enabling steam to be admitted alternately between the two pistons of the said cylinder and upon their outer faces in order to produce a reciprocation of the pistons of each cylinder, the said equilibrated distributing device comprising a reciprocating hollow valve R or R' open at both ends and provided with three annular peripheral grooves $h, k, o$, or $h', k', o'$, of which one $k$ or $k'$ communicates with the inside of the valve by holes $j, j$ or $j', j'$, and a valve-chest communicating with the middle of the corresponding cylinder by a passage $e$ or $e'$, with the two ends of the same cylinder by two passages $g, f$ or $g', f'$ and with the exhaust by two passages $i, n$ or $i', n'$ substantially as hereinbefore described and illustrated.

2. An equilibrated steam-engine having a double-acting cylinder with the pistons fitted to two different rods of which one passes through the other and is connected by means of a connecting-rod to a crank placed at an angle of one hundred and eighty degrees to the cranks to which the second piston-rod is connected, through the medium of two connecting-rods placed on each side of the first-named connecting-rod, and an equilibrated distributing device comprising a hollow valve R open at both ends and with three annular peripheral grooves, three steam-passages from the valve-chest to the cylinder and two passages for the exhaust of steam, so as to enable steam to be admitted alternately between the two pistons of the cylinder and upon their outer faces in order to produce a reciprocation of the pistons, in combination with three concentric secondary valves R$o$ arranged in the said hollow valve R and placed upon a common rod N$o$ passing through the rod N of the valve R, the valve R being actuated by an ordinary eccentric upon the driving-shaft, while the valves R$o$ are operated by a device alone actuated by the governor of the engine for the purpose of obtaining variations in the expansion in the cylinder of the engine, substantially as hereinbefore described and illustrated.

3. An equilibrated steam-engine having one or more double-acting cylinders each having two pistons fitted to two different rods of which one passes through the other and is connected by means of a connecting-rod to a crank placed at an angle of one hundred and eighty degrees to the cranks to which the second piston-rod is connected through the medium of two connecting-rods placed on each side of the first-named connecting-rod, and an equilibrated distributing-valve for each cylinder, in combination with a device for insuring the tightness of the joint between the pistons of each cylinder which is the nearest to the driving-shaft and the rod of the piston which is the farthest from the said shaft, between the rod of the piston which is the nearest to the driving-shaft and the bottom of the cylinder or between the rod of the distributing-valve and the bottom of the valve-chest, the said device consisting of two superposed rows of packing-pieces of antifriction metal, each of which is formed of four pieces $d^3, d^3, d^4, d^4$ of which the two opposite pieces $d^3, d^3$ are in the form of segments of a circle while the two others $d^4, d^4$ have the form of portions of rings fitting the said segments in order that each row of pieces $d^3, d^3, d^4, d^4$ shall form an annular packing, each of the said pieces $d^3, d^3, d^4, d^4$ being separately pressed against the rod passing between them by a separate spring $d^{14}$, the ends of which abut against internal projections in a box $d^5$ inclosing the two rows of packing-pieces of which two rows the lower rests upon a ring $d^9$ applied against an annular projection $d^{10}$ of the box $d^5$, a washer $d^{11}$ being applied to the upper row of packing-pieces, which said washer is acted upon by springs $d^{13}$ pressing the two rows of packing-pieces against one another between the washer $d^{11}$ and the ring $d^9$, substantially as hereinbefore described and illustrated.

4. In a steam-engine of the kind hereinbefore described, the arrangement of the pivot $d^2$, $d^2$ by which the hollow rod of the lower piston of each cylinder actuates the two connecting-rods connecting it to the driving-shaft, the said pivots being rigidly connected to a cross-piece $D^2$ adapted to oscillate over a cylindrical journal formed on a piece $c^{10}$ fixed to the said hollow piston-rod and provided with a pivot connected to a guide-piece running in suitable guides in order that the said cross-piece $D^2$ can take a slightly-inclined position with respect to the longitudinal axis of the piston-rod, if the two said connecting-rods be not exactly of the same length, substantially as described.

5. An equilibrated steam-engine having a double-acting cylinder with two pistons fitted to two different rods of which one passes through the other and is connected by means of a connecting-rod to a crank placed at an angle of one hundred and eighty degrees to the cranks to which the second piston-rod is connected through the medium of two connecting-rods placed on each side of the first-named connecting-rod and an equilibrated distributing device comprising a hollow valve open at both ends and with three annular peripheral grooves, three steam-passages from the valve-chest to the cylinder and two passages for the exhaust of steam, in combination with four tubes fixed on the valve-chest and communicating respectively with the latter and the said steam-passages, a common vertical passage connected to these four tubes, three-way cocks designed to put these tubes into communication with the said vertical passage in order to enable the cylinder to be heated before the engine is started, substantially as hereinbefore described and illustrated.

In witness whereof I have hereunto signed my name in the presence of two subscribing witnesses.

EMILE MERTZ.

Witnesses:
AMAND RITTER,
GEORGE GIFFORD.